United States Patent [19]

Hiestand

[11] Patent Number: 4,611,814

[45] Date of Patent: Sep. 16, 1986

[54] METHOD AND APPARATUS FOR MONITORING THE OPERATING READINESS OF POWER CHUCK

[75] Inventor: Karl Hiestand, Mühlweg, Fed. Rep. of Germany

[73] Assignee: SMW Schneider & Weisshaupt GmbH, Fed. Rep. of Germany

[21] Appl. No.: 695,442

[22] Filed: Jan. 28, 1985

[30] Foreign Application Priority Data

Jan. 28, 1984 [DE] Fed. Rep. of Germany ....... 3402989

[51] Int. Cl.$^4$ .............................................. B23B 31/30
[52] U.S. Cl. .................................... 279/111; 279/20; 279/123

[58] Field of Search ......................... 409/220; 408/16; 279/123, 110, 4, 1 B, 1 SJ, 1 L, 111, 121, 20; 29/568

[56] References Cited

U.S. PATENT DOCUMENTS 3,779,110 12/1973 Harman et al. ................... 29/568 X
4,504,824 3/1985 Mello ................................. 408/16 X Primary Examiner—Z. R. Bilinsky
Attorney, Agent, or Firm—McGlew and Tuttle

[57] ABSTRACT

To check the operating conditions of a power chuck, compressed air is supplied to the contact surfaces of the clamping jaws and/or of the workpiece to be clamped. Air passages are provided in the chuck body which open into the contact surfaces. The escaping air makes it possible to find out whether the contact is planar, and thus whether the clamping is exact.

11 Claims, 4 Drawing Figures

METHOD AND APPARATUS FOR MONITORING THE OPERATING READINESS OF POWER CHUCK

FIELD AND BACKGROUND OF THE INVENTION

This invention relates in general to chucking devices and in particular to a new and useful method and apparatus for monitoring the operating readiness of a power chuck.

From German Pat. No. 26 32 228, there is known an air-blast device carried on a machine tool spindle, with which chips, cooling liquid, or other foreign matter which might have penetrated into the spindle socket, can be blown out. To this end, a plurality of circumferentially distributed blow apertures is provided in the wall of the socket which communicate with compressed air supply passages extending outwardly obliquely in the zone of the front edge of the tool holder. This device does ensure a cleaning of the tool shank, the operating readiness of a power chuck, however, cannot be monitored with such an arrangement.

SUMMARY OF THE INVENTION

The present invention is directed to an arrangement for reliably determining in a power chuck in rest position, in a very simple way, whether or not the clamping jaws, and/or the workpiece to be clamped, apply against the associated contact faces correctly over their entire respective surface areas and to be able to correct this position prior to starting the operation and thus to avoid possible accidents caused by catapulted inaccurately clamped jaws or workpieces. The capital costs of such an arrangement are to be low and the handling must be simple. Primarily, however, the arrangement is to allow under any conditions a reliable and safe checking of the mutual position of the parts, particularly also in power chucks which are equipped for an automatic change of clamping jaws.

In accordance with the invention an apparatus for monitoring the operating conditions of the power chuck at standstill in respect to the clamping of a workpiece includes a chuck body which has a radially extending groove with a clamping jaw drivingly guided in the chuck body groove. The arrangement includes pressure fluid supply which is connectable to a flow passage defined in the chuck body which connects through a similar passage in the jaw and which terminates in a passage directed outwardly toward the workpiece contacting surface of a clamping jaw. Advantageously, the fluid source is connectable to a movable piston which is arranged in fixed locations such that it may be moved to engage in an airtight manner against the chuck so that a central fluid passage in the chuck may be connected for the flow of the fluid through the chuck body to a clamping jaw. The flow of the fluid is passed the contact surfaces between the body and the jaw and also between the engagement surface of the jaw with the workpiece. With the inventive method, the flow of the fluid is monitored so that quantity of fluid which is directed outwardly will indicate whether the contact surfaces between the jaws and the chuck body and the jaws and the workpiece are in proper planar contact.

Advantageously, the fluid is compressed air and the associated contact surfaces of the clamping jaws and the workpiece to be clamped open into the respective engaging contact surfaces perpendicularly thereto. The clamping jaws have a compressed air passage which forms a jet pointed at the respective clamping surface engaged with the workpiece.

In a development of the invention, the contact areas of the outlets of the fluid passages from the chuck body to the clamping jaws and from the master jaw to a false clamping jaw or to a change cassette are sealed by means of a surrounding sealing element defined between the engaged surfaces. Advantageously, an outlet or inlet of the fluid passage opening into a contact surface of two adjacent component parts of the power chuck are displaceable relative to each other and comprise an oblong orifice or a slot or a conical or flaring port.

The invention advantageously includes a feed member such as a displaceable piston which is mounted in a fixed location may be displaced into sealing engagement with the chuck body. In this manner, the compressed air source may be hermetically coupled to the chuck body. The piston is advantageously guided in a fixed holder for displacement perpendicularly to the axis of the chuck body or parallel to the longitudinal axis thereof, and may be displaced against the action of a return spring which has an outer circumferential surface area exposable to the compressed air and a centric compressed air supply passage which communicates with the passage air supply line and is connectable to a passage provided in the chuck body. In order to couple the displacement piston hermetically to the chuck body a sealing element surrounding the compressed air supply passage of the displacement piston is inserted in the front surface facing the chuck body of the piston and the sealing element can be pressed into contact with the outer surface of the chuck body. With a displacement of the piston perpendicularly to the chuck axis, the outer cylindrical surface of the chuck body is provided with a planar contact surface area.

A power chuck having automatically changeable clamping jaws or receiving exchange cassettes open into the contact surfaces of the master jaws and they are disposed in such a manner that when the clamping jaws or clamping cassettes are clamped in a coupled position, they communicate with the compressed air passages provided in the clamping jaws or cassettes.

In order to monitor the operating condition of a lock pin engaging the respective clamping jaw or cassette, a control slide in the form of a bushing inserted in the master jaw and allows the passage of compressed air and is associated with the lock pin. A cavity of the bushing is dimensioned to be engaged by an extension of the lock pin so as to completely or partially shut off the compressed air flow therethrough.

In accordance with a method of the invention, a flow controller is provided in the compressed air supply and is advantageously associated with the displacement piston. In this manner, the monitoring of the air flow will indicate when the contact surfaces are not in correct planar adjustment. Dirt and foreign matter deposited on the clamping surfaces can thus easily be removed so that the clamping surfaces remain permanently clean and faulty clamping is avoided. The arrangement of the invention makes sure that air passages provided in the chuck body or in the clamping jaws or in the central annular conduit of the chuck body would be supplied with compressed air quickly and reliably.

The inventive arrangement is not only simple in construction and thus inexpensive to manufacture, but also reliable in service by making possible a permanently satisfactory monitoring of the clamping conditions of the parts. That is, if compressed air or other pressure fluid is supplied to the contact surfaces of the clamping jaws and/or the workpiece, the air flows out of the passages opening into the contact surfaces, and a signal can be derived therefrom indicating the operating condition of the respective part and thus whether or not the operation of the machine tool can safely be started. The determined velocity of flow in the fluid passages is the measure showing the exact or inexact contact between the master jaws and the clamping jaws, or the clamping jaws and the workpiece. The respective signals can be evaluated by means of a flow controller.

Further, the compressed air flowing out may be used for cleaning the contact surfaces of the clamping jaws, so that faulty clamping caused by dirt is also eliminated in this way. Since the planar contact will always be checked with the chuck in rest position, no secondary effects can occur which might require compensation. Another advantage is that the inventive arrangement does not require any additional space in the chuck. The air passages can be provided both in the chuck body and in the jaws, and the operation of the spindle is not obstructed by the supply lines.

Accordingly, it is an object of the invention to provide an improved device for sensing the operating condition of a power chuck which includes means for directing a fluid under pressure through the chuck body into a similar passage in a chuck jaw through the plane of the contact surfaces therebetween so as to sense the condition of the contact surfaces.

A further object of the invention is to provide a method of maintaining operative stability of a power chuck and for determining the condition of its contacting surfaces which comprises directing a pressure fluid through a bore of the chuck preferably substantially perpendicular to contact surfaces between the chuck body and the jaw and through the jaw and against the workpiece so as to sense the engagement condition of the jaw with the body and the jaw with the workpiece.

A further object of the invention is to provide a power chuck which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
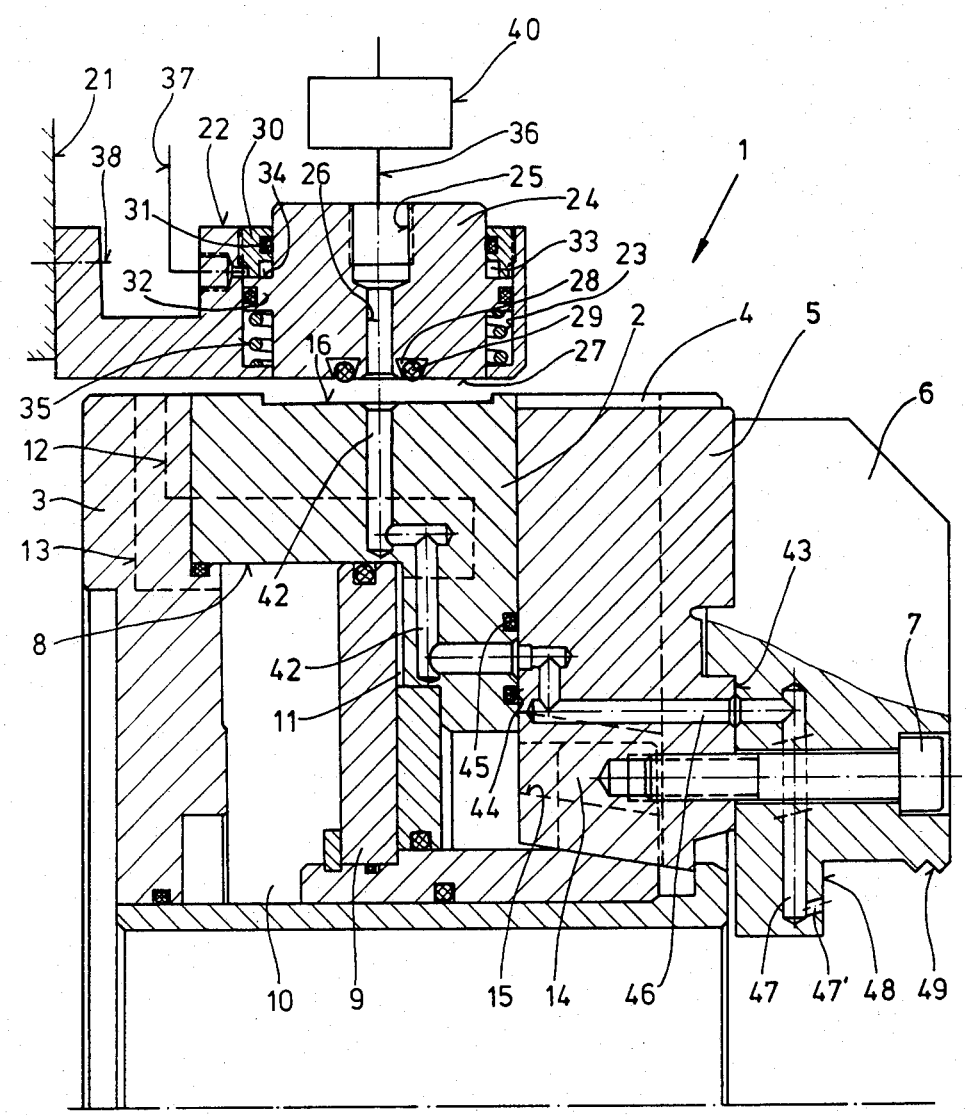
FIG. 1 is an axial sectional view of a power chuck where the planar contact between the clamping jaws and the master jaws and the contact between the clamping jaws and the workpiece are monitored in accordance with the invention.

Referring to the drawings in particular the invention embodied therein comprises an arrangement and method for monitoring the operating conditions at standstill of a power chuck in respect to a workpiece to be clamped. In accordance with the invention, the chuck generally designated 1 includes a chuck body portion 2 which has at least one master clamping jaw 5 movable in a radial groove 4 thereof. In accordance with the method of the invention, means are provided for detecting the operating conditions of the chuck at standstill by directing a pressure fluid through bores of the chuck body through the plane of the contacting surfaces between the chuck body and engagement jaw and subsequently from the engagement jaw against the workpiece. With the inventive method, the amount of flow is monitored by a flow controller 40 and the flow characteristics will indicate whether the parts are arranged in proper planar contact.

The power chuck 1 shown in FIG. 1 substantially comprises a chuck body 2 which is closed at its rear by a cover 3, and master jaws 5 which are displaceably guided in radially extending grooves 4 and to which clamping jaws 6 are secured by means of bolts 7. Master jaws 5 are movable by means of a piston 9 which is accommodated in a cylinder space 8 and connected through taper keys 14 positively engaging wedge grooves 15 provided in master jaws 5. Upon supplying compressed air through conduits 12 or 13 indicated in dotted lines into a selected one of the pressure to the right or left. This axial movement of the piston is transformed by the cooperation of taper keys and wedge grooves 15 into a radial movement so that master jaws 5 and clamping jaws 6 firmly connected thereto are displaced outwardly or inwardly, and release or tighten the clamping of the workpiece.

To find out whether clamping jaws 6 apply completely against the radial contact surfaces 43 of master jaws 5 and/or a clamped workpiece applies against radial facing contact surfaces 48 of clamping jaws 6, compressed fluid or air passages 42, 46, 67 are provided in chuck body 2 and in every master and clamping jaw 5 and 6, which open into contact surfaces 43, 48 and can be connected through a compressed air source in predetermined positions of the chuck body 2. To prevent the compressed air from escaping sidewards during a checking, grooves 44 surrounding every outlet of air passages 42 in chuck body 2 are provided, in which sealing rings 45 are received.

Compressed air passages 42 open into contact surfaces 43 of master jaws 5 perpendicularly, while into contact surfaces 48 of clamping jaws 6 they open through an oblique connecting passage 47' which extends in the direction of the axial clamping area 49 of clamping jaws 6. The purpose is to be able to direct an air or fluid jet to that area prior to clamping the workpiece, and thus to clean that portion of the jaws from chips and other foreign matter.

To supply compressed air, with the chuck in rest position, always into one of the air passages 42 associated with a respective clamping jaw 6, a support or holder 22 is provided which is secured with screws 38 to a wall 21. The support 22 comprises a cylindrical cavity 23 accommodating a displacement piston 24 which is associated with a connection 25 for a line 36 leading to the compressed air source, and with a central feed conduit 26. In the front face 27 of piston 24, a seal ring 29 is received in a groove 28, to be pressed against a recessed surface 16 which is provided on the chuck body 2. During such a pressure contact, air from conduit 26 can flow into one of the passages 42. It is also possible, of course, to provide chuck body with a centric circular groove into which air passages of the individual clamping jaws 6 open.

Piston 24 is held in its upper end position by means of a ring 30 carrying a seal 31, and a return spring 35. As soon as, with chuck 1 in one of the predetermined positions. compressed air from a line 37 is supplied into pressure space 33 of piston 24, to act against face 34 which is formed by an annular flange 32, piston 24 is displaced in the direction of the chuck and hermetically coupled thereto. Then, in this position, if air is supplied into passage 42, the air flows through passage 46 and 47 to escape a contact surface 38. The respective velocity of flow can be measured with a flow controller 40 in supply line 36, and stored. If then, after a jaw change, one or the other of jaws 5 does not fittingly apply against its associated contact surface 43, a greater amount of air escapes through the formed gap, which is a sign that the respective clamping jaw does not apply exactly to the master jaw.

Since with a correct clamping of the workpiece, the air passages 47' are closed almost hermetically and only a very small air amount flows under these conditions through flow controller 40, small measured values indicate that the workpiece is well clamped to contact surfaces 48. However, as soon as larger air amount escapes, the larger flow measured by controller 40 prompts checking of the clamping before the operation of the machine is started.

Figure 2:
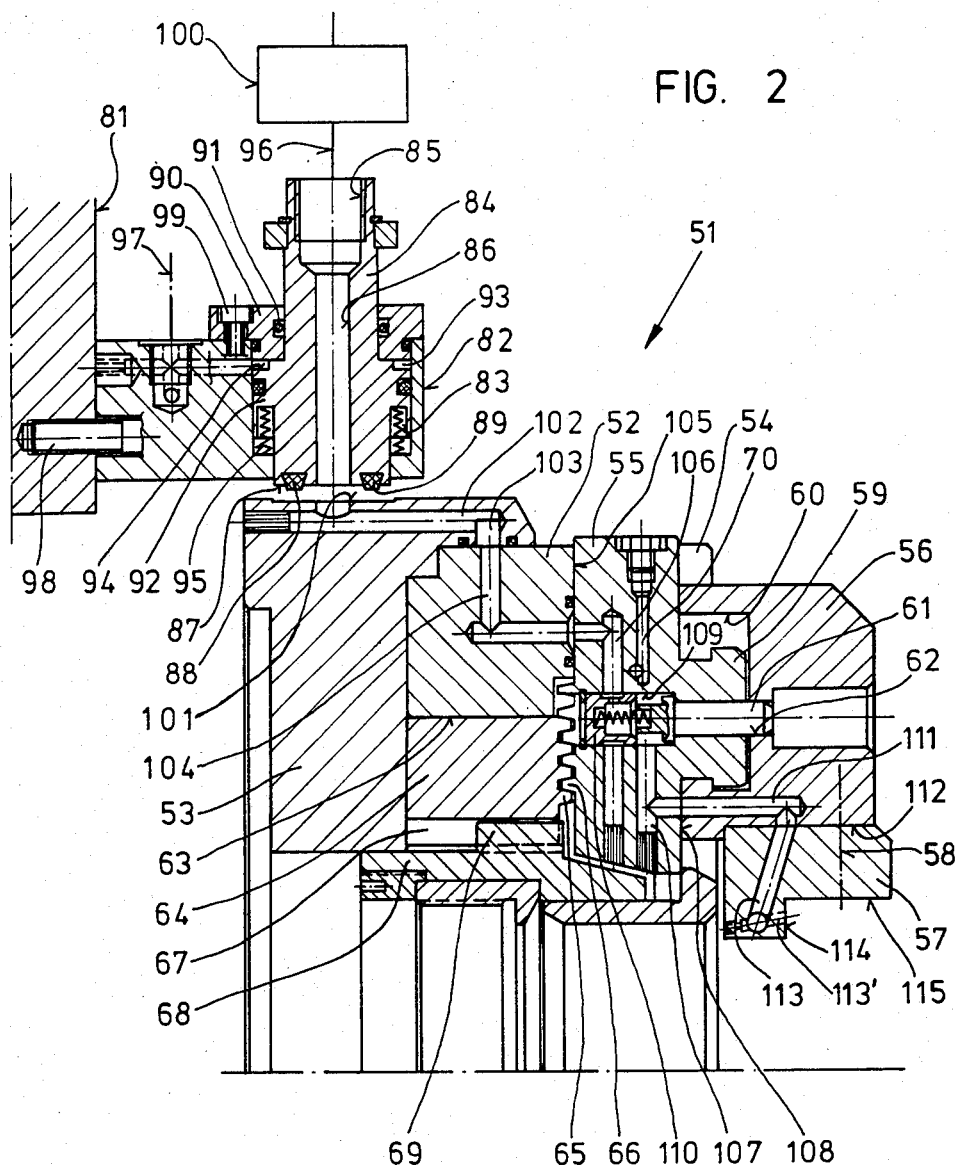
FIG. 2 is an axial sectional view of another embodiment of a power chuck with mechanically changeable clamping cassettes, where the planar contact of the individual parts and the workpiece, and the locking of the cassettes, are to be checked.
Figure 3:
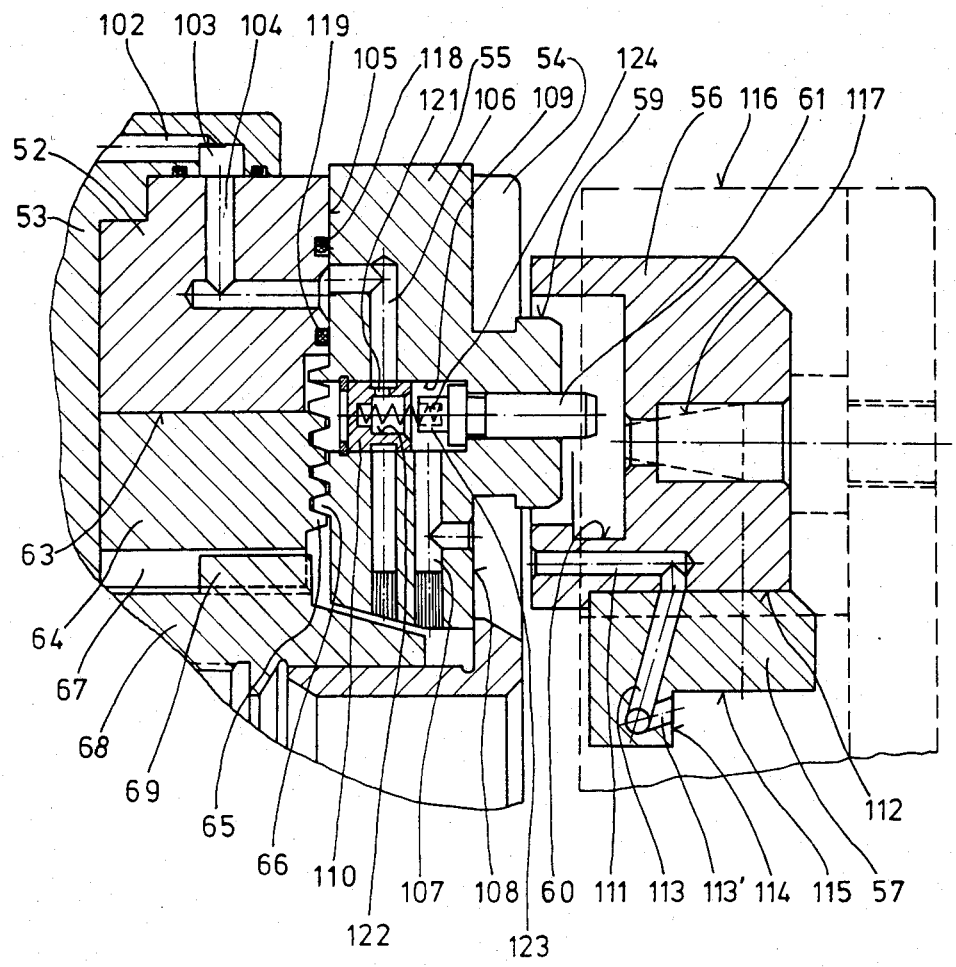
FIG. 3 is an axial sectional view of the chuck according to FIG. 2 during a change of cassettes.
Figure 4:
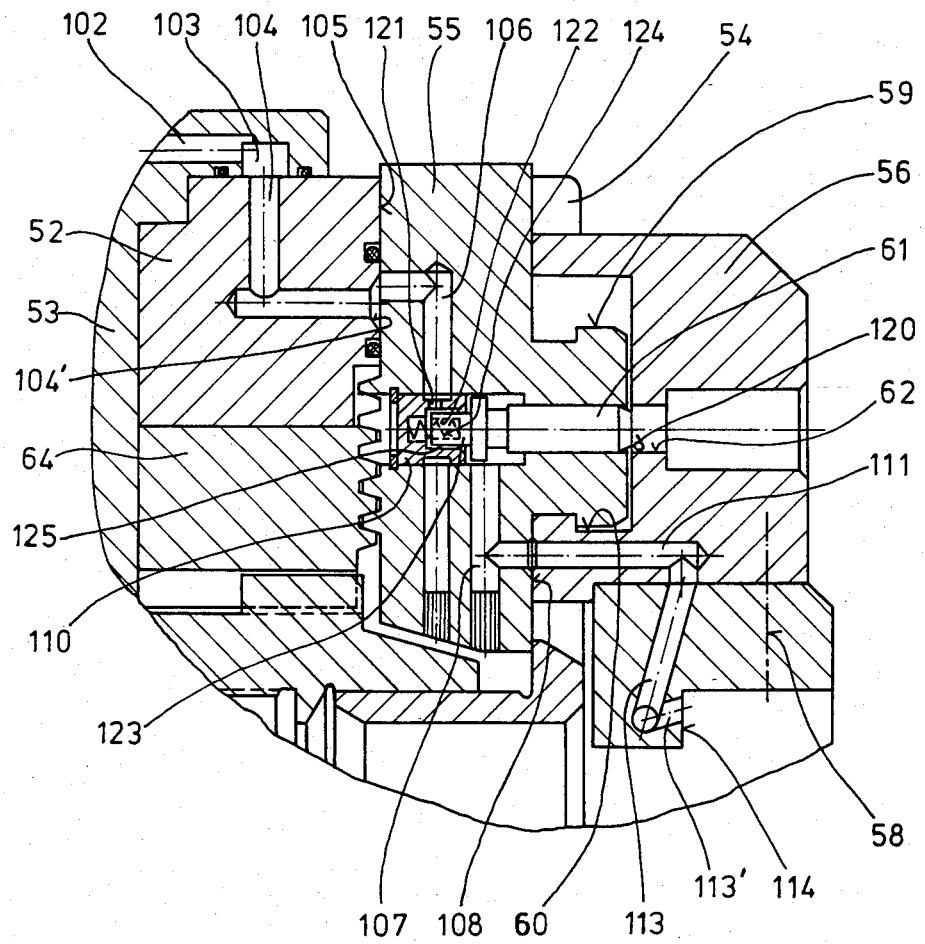
FIG. 4 is an axial sectional view of the chuck according to FIG. 2 with a non-arrested cassette.

The power chuck 51 shown in FIGS. 2-4, also comprises a chuck body 52 which is closed on the rear side by a cover 53, and master jaws 55 which are displaceable in radially extending grooves 54 by means of a tengentially extending wedge bar 64 received in a pocket 63. To actuate wedge bars 64, which carry teeth 65 meshing with corresponding teeth 66 of master jaws 55, a piston 68 is provided which is axially displaceable by means of a connecting rod (not shown) and engages through taper gibs 69 formed thereon, wedge grooves 67 which are provided in bars 64. An axial movement of piston 68 is thus transformed by wedge bars 64 into a radial movement of master jaws 55.

In this embodiment, mechanically changeable clamping cassettes are associated with the master jaws, to which an also exchangeable clamping insert 57 can be secured by means of screws 58. To connect the cassettes 56 to the master jaws 55, which are provided with lubricant grooves 70, in a simple way and positively, each master jaw 55 has a flange extension 59 and the cassettes 56 are provided with recesses 60 engageable therewith. Further, a lock pin 61 is inserted in each extension 59 which is introducible into a bore 62 of the cassette 56 to lock it to the master jaw 55. The cassettes 56 are moved in and away by means of a pallet 116 indicated in broken lines of FIG. 3.

To check the exact contact between a cassette 56 and a face 108 of a master jaw 55 or between a workpiece to be clamped and a radial face 114 of a clamping insert 57, air passages 104, 106 and 107, as well as 111 and 113, 113' are provided in chuck body 52 and in master jaws 55 and cassettes 56, respectively, which communicate with an annular conduit 103 supplied with compressed air, and open each into a radial contact surface 105, 108 or 114. Under certain conditions, the correct contact between clamping inserts 57 and axial surfaces 112 of cassettes 56 can also be checked.

Again a support or holder 82 secured by screws 98 to a wall 81 and designed with a cavity 83, and a displacement piston 84 accommodated therein are provided to supply compressed air into annular conduit 103. Piston 84 is provided with a connection 85 for an air supply line 96 and a central feed passage 86. In the front face 87 turned to chuck body 52 of of piston 84 which is displaceable against the action of a spring 95 by supplying compressed air through a line 97 into pressure space 93, a seal 89 is inserted in a groove 88, which hermetically applies against the planar surface 101 of chuck body 2. In this operating position, compressed air can pass from supply line 96 equipped with a flow controller 100, through passages 86 and 102 into annular conduit 103. Piston 84 is supported by a ring 90 which is secured to holder 82 by screws 99 and provided with a seal ring 91, and its face 94 is formed by a flange 92.

Upon supplying compressed air into annular conduit 103 and with cassettes 56 locked to master jaws 55, as shown in FIG. 2, the contact between a clamped workpiece and surfaces 114 of clamping inserts 57 can be checked. Since in this instance the air passages 113 are almost hermetically closed, the correct clamping can be inferred from the velocity of flow in flow controller 100. Prior to clamping the workpiece, however, the axial clamping areas 115 of insert 57 may be cleaned from foreign matter, since the terminal portions 113' of air passages 113 extend obliquely, in the direction of these clamping areas.

The planar contact between the cassettes 56 and surfaces 108 of master jaws 55 can be checked upon an exchange of the cassettes. Should air passages 107 and 111 not communicate with each other properly, the air flowing therethrough will be throttled at the flow through controller 100 reduced, as compared to a position with a proper contact. This again is an evaluable signal.

As shown in FIG. 4, it may further be checked, after locking cassettes 56 to extensions 59 of master jaws 55, whether lock pin 61 is engaged in associated bore 62, for this purpose, a control slide in the form of a bushing 110 with a cavity 122 is inserted in a bore 109 of each of master jaws 55.

Bushing 110 accommodates a compression spring 124 acting on the lock pin 61, and is provided with a passage 121 for the compressed air. Lock pin 61 is designed with an extension 123 to be received in cavity 122.

If, for example, chips 120 have penetrated into bore 62, or if cassette 56 is not exactly in its position, extension 123 of lock pin 61 protrudes into cavity 122 and closes the air passage through bushing 110 completely or partly, depending on the chosen gap therebetween. Then the compressed air cannot pass from air passage 106 into air passage 107. The thereby restricted or stopped air flow in line 96 is again an evaluable signal.

To remove cassette 56 in the radial direction, lock pin 61 is pushed back into extension 59 by means of a pin 117 provided on pallet 116.

With the component parts being adjustable relative to each other, it is advantageous to design the outlets and-/or inlets of the mutually communicating air passages in the form of oblong orifices, slots, or flaring openings. In FIG. 4, for example, outlet 104' is shown as a flaring opening provided in chuck body 52, to insure an air passage in every position of master jaws 55. Further, to make sure that the air will correctly pass into master jaws 55, seal rings 119 received in corresponding grooves 118 are provided surrounding the outlets of air passages 104.

While specific embodiments of the invention have been shown and described in detail to illustrate the application of the principles of the invention, it will be understood that the invention may be embodied otherwise without departing from such principles.

What is claimed is:

1. An arrangement for monitoring the operating conditions at standstill of a power chuck with respect to the workpiece to be clamped by the power chuck, comprising:
    a chuck body having a radially extending groove;
    a master jaw guided for radial movement in said radially extending groove;
    a clamping jaw fixed to said master jaw;
    said chuck body and said master jaw having interengageable radial contact surfaces;
    said master and clamping jaws having interengageable contact surfaces;
    said clamping jaw and the workpiece having interengageable contact surfaces;
    a fluid passage having portions extending through said chuck body, said master jaw and said clamping jaw with an inlet end in said chuck body and an outlet end in said clamping jaw at said contact surface of said clamping jaw interengaged with the contact surface of the workpiece; said portions of said fluid passage communicating with each other over said interengageable contact surfaces when said chuck body, master jaw, clamping jaw and workpiece are in a correct relative position for clamping the workpiece; and a pressure fluid source connectable to said inlet of said fluid passage for supplying fluid to said fluid passage.

2. An arrangement according to claim 1, wherein said interengageable contact surfaces of said clamping jaw and the workpiece including an axial clamping portion and a radial facing portion, said portion of said fluid passage extending in said clamping jaw having an oblique section with an outlet in said radial facing portion, said oblique section inclined in a direction toward said clamping portion whereby fluid supplied by said pressure fluid source in the absence of a workpiece cleans said clamping portion of said clamping jaw contact surface.

3. An arrangement according to claim 2, including a feed member for supplying compressed air into said passage portion of said chuck body said feed member being mounted along side said chuck body for displacement relative to said chuck body said chuck body having at least one central fluid line which is connectable to said feed member.

4. An arrangement according to claim 3, wherein said feed member comprises a displacement piston, a holder carrying said piston for displacement therein located along side said chuck body, a return spring acting on said piston for moving it in a return direction, said feed member having a centric compressed air supply which is movable into juxtaposition with a central fluid supply in said chuck body.

5. An arrangement according to claim 1, wherein said piston includes an end face having an annular groove and a central flow passage within the center of said annular groove, and a sealing member carried in said groove and enagagable against said chuck body.

6. An arrangement according to claim 5, wherein said chuck body includes a central fluid flow passage and having a planar exterior surface engagable by said piston.

7. An arrangement according to claim 2, including a sealing member engaged between said interengageable contact surfaces of said chuck body and said master jaw, said sealing member disposed around an area of communication between said portions of said fluid passage in said chuck body and master jaw when said chuck body and master jaw are in their correct relative position.

8. An arrangement according to claim 1, including an automatically exchangeable cassette carrying said clamping jaw and engagable with said master jaw.

9. An arrangement according to claim 1, wherein to monitor the operating condition said chuck includes a lock pin engaging said clamping jaw, a control slide in the form of a bushing inserted in said master jaw and allowing the passage of fluid associated with said lock pin said bushing having cavity dimension to be engaged by an extension of said lock pin so as to at least partially set off the compressed air flow therethrough.

10. An arrangement according to claim 9, wherein said lock pin is mounted for axial movement in said master jaw, said bushing being connected to said lock pin, said master jaw having an opening in which said bushing is movable, said bushing being movable to a locking position when said locking pin is engaged with said clamping jaw and into an unlocking position when said locking pin is not engaged with said clamping jaw, said portion of said passage extending in said master jaw traversing said opening of said bushing, said bushing at least partly blocking the passage of fluid through said opening in its unlocking position and permitting the free passage of fluid through said opening in its locking position.

11. An arrangement according to claim 1, including a flow controller connected into the flow from the pressure fluid source to the passage in said chuck body.

* * * * *